United States Patent
Rostampour et al.

(10) Patent No.: US 8,725,672 B2
(45) Date of Patent: May 13, 2014

(54) METHOD FOR DETECTING SUSPICIOUS INDIVIDUALS IN A FRIEND LIST

(75) Inventors: Arad Rostampour, San Bruno, CA (US); Noah Benjamin Suojanen Kindler, San Bruno, CA (US); Russell Douglas Fradin, San Bruno, CA (US); Steven Cary Heyman, San Bruno, CA (US)

(73) Assignee: Avira B.V. (NL)

( * ) Notice: Subject to any disclaimer, the term of this patent is extended or adjusted under 35 U.S.C. 154(b) by 226 days.

(21) Appl. No.: 13/157,536

(22) Filed: Jun. 10, 2011

(65) Prior Publication Data

US 2011/0307434 A1 Dec. 15, 2011

Related U.S. Application Data

(60) Provisional application No. 61/354,108, filed on Jun. 11, 2010.

(51) Int. Cl.
*G06F 17/00* (2006.01)

(52) U.S. Cl.
USPC ............................................ 706/45; 705/319

(58) Field of Classification Search
USPC ............................................ 706/45; 705/319
See application file for complete search history.

(56) References Cited

U.S. PATENT DOCUMENTS

| | | | |
|---|---|---|---|
| 7,856,411 B2* | 12/2010 | Darr | 706/45 |
| 2005/0159998 A1* | 7/2005 | Buyukkokten et al. | 705/11 |
| 2007/0005654 A1* | 1/2007 | Schachar et al. | 707/104.1 |
| 2007/0226248 A1* | 9/2007 | Darr | 707/102 |
| 2007/0282623 A1 | 12/2007 | Dattorro | |
| 2008/0033941 A1 | 2/2008 | Parrish | |
| 2008/0086551 A1* | 4/2008 | Moy | 709/223 |
| 2008/0094230 A1* | 4/2008 | Mock et al. | 340/573.4 |
| 2008/0162692 A1* | 7/2008 | Schultz et al. | 709/224 |
| 2008/0282324 A1* | 11/2008 | Hoal | 726/3 |
| 2009/0089417 A1* | 4/2009 | Giffin et al. | 709/224 |
| 2010/0332405 A1* | 12/2010 | Williams | 705/319 |
| 2011/0208824 A1* | 8/2011 | Lidstrom et al. | 709/206 |
| 2012/0016948 A1* | 1/2012 | Sinha | 709/207 |

OTHER PUBLICATIONS

Coffman, T.R.; Marcus, S.E., "Pattern classification in social network analysis: a case study," Aerospace Conference, 2004. Proceedings. 2004 IEEE , vol. 5, No., pp. 3162,3175 vol. 5, Mar. 6-13, 2004.*

Guo, Richard M. Stranger Danger and the Online Social Network. Berkeley Tech. Law Journal, vol. 23, p. 617-644, 2008.*

Pendar, N., "Toward Spotting the Pedophile Telling victim from predator in text chats," Semantic Computing, 2007. ICSC 2007. International Conference on , vol., No., pp. 235,241, Sep. 17-19, 2007.*

(Continued)

*Primary Examiner* — Allan Chen
*Assistant Examiner* — David H Kim
(74) *Attorney, Agent, or Firm* — Cooley LLP

(57) ABSTRACT

A method is provided for detecting friend or potential friend candidates as being suspicious in an OSN. A processor is used to obtain at least one candidate as being a suspicious friend in the OSN. One or more risk factors are used in the analysis. Heuristics are applied to the risk factors with the processor. In response, a determination is made as to whether the candidate is a suspicious individual. The processor can be software, hardware, or one or more individuals can use manual methods, to do the analysis and make the determination.

27 Claims, 8 Drawing Sheets

(56) References Cited

OTHER PUBLICATIONS

Yohannis, A.R.; Sastramihardja, H., "Recognizing deviants in Social Networking Sites: Case study fupei.com," Electrical Engineering and Informatics, 2009. ICEEI '09. International Conference on, vol. 2, No., pp. 507,512, Aug. 5-7, 2009.*

B. Bigi et al., "A Comparative Study of Topic Identification on Newspaper and E-mail," in String Processing and Information Retrieval-SPIRE, IEEE Computer Society, 2001.

Y. Freund & R. Shapire, "Large Margin Classification Using the Perceptron Algorithm," Machine Learning, vol. 37, No. 3, pp. 277-296 (1999).

C. Saunders et al., Support Vector Machine Reference Manual, Department of Computer Science, Royal Holloway, University of London, 1998.

J. Lafferty et al., "Conditional Random Fields: Probabilistic Models for Segmenting and Labeling Sequence Data," ICML, 2001.

C. J. Burges, "A Tutorial on Support Vector Machines for Pattern Recognition," in Data Mining and Knowledge Discovery, 1998, pp. 121-167.

P. Langley et al., "An Analysis of Bayesian Classifiers," In Proceedings of the Tenth National Conference on Artificial Intelligence, San Jose, Calif., 1992, pp. 399-406.

A. Berger et al., "A Maximum Entropy Approach to Natural Language Processing," Computational Linguistics, vol. 22, No. 1, pp. 39-71 (1996).

J. Goodman, "Exponential Priors for Maximum Entropy Models," HLT-NAACL 2004: Main Proceedings, pp. 305-312, Boston, Mass., USA, May 2-May 7, 2004, Association for Computational Linguistics.

I. Zitouni et al., "Constrained Minimization Technique for Topic Identification using Discriminative Training and Support Vector Machines," in Proceeding of the International Conference on Speech and Language Processing, 2004.

* cited by examiner

METHOD FOR DETECTING SUSPICIOUS INDIVIDUALS IN A FRIEND LIST

CROSS-REFERENCE TO RELATED APPLICATIONS

This application claims the benefit of U.S. 61/354,108 filed Jun. 11, 2010, which application is fully incorporated herein by reference.

BACKGROUND OF THE INVENTION

1. Field of the Invention

The present invention relates to the field of computerized social networking, and more particularly to systems and methods for detecting undesirable friends in a social network user's friends list.

2. Description of the Related Art

An on-line social network ("OSN") refers to a social structure of nodes each associated with a different person or organization. The interconnections of each node reflect direct relationships between the respective people and organizations such that the directness of a relationship between two persons or organizations associated with respective nodes can be summarized by the path of interconnections between the respective nodes. It can be reciprocal and symmetric, like friends, that are requested/accepted (e.g. Facebook), or it can be one-way and asymmetric where one person follows another person (e.g. Twitter). In this way, any one individual in an OSN can evaluate the number and quality of social relationships with others in the network, those relationships ranging from close familial bonds to casual acquaintances.

The advent of the global Internet has changed the way in which OSNs can be viewed. Originally, a mere visual tool describing a social phenomenon, computerized OSNs facilitate the recognition and expansion of OSNs among interacting users across the globe. Whereas geographic boundaries previously limited the extent and quality of a given OSN the global Internet enables limitless expansion of the OSN based upon a vast set of aware collaborators coupled by the fabric of computer communications.

Commercial computerized OSNs have become wildly popular in recent years—especially amongst the younger demographic. Examples include the MySpace™ computer socialized network maintained by MySpace, Inc. of Los Angeles, Calif., LinkedIn™ computerized business network maintained by LinkedIn Corporation of Palo Alto, Calif., and the Facebook™ computerized OSN maintained by Facebook of Palo Alto, Calif. Commercial computerized OSNs represent OSN services connecting users according to different types of interests in an aggregated view, and provide the ability to share a personal profile and communicate with other users in the OSN. Generally, computerized OSNs generate revenue through ad placements in the Web site. It also offers other functionality including messaging, chat, sharing of items (posts, pictures, videos, notes, comments, groups, events, location, and the like.

Generally, commercial computerized OSNs allow users to create individual profiles. Each profile can include visual materials such as photographs of the user and things relevant to the user. Each profile further can include textual materials such as lifestyle information, or general writings. Notably, users can friends. These friends can be specified manually by a given user and often represent the individuals most favored by the given user. Each of the favorite friends can be presented in the Web site so as to allow linking to a corresponding profile for the favorite friend. In this way, an end user literally can navigate the OSN for a given user.

The online OSN is accomplished in a variety of ways. Personal information is exchanged with one another through an Internet homepage, blog, Internet cafe (community), and the like, and people exchange opinions and information or chat with other people by means of emails, web bulletin boards, web memoranda, reply notes, chatting, and the like. On the other hand, a membership system maintained through a membership join and authentication process has put the OSN in order to some extent.

There is a problem with adding friends who are undesirable friends, particularly for children. One common mechanism for combating this problem involves members of law enforcement agencies and private vigilantes setting up bogus identities on the Internet and waiting to be contacted by delinquents. In the case of sexual predators, for example, members of a police department may set up a bogus identity as an inviting, under-age girl or boy, then wait for the predators to find them. Well-known implementations of this approach include efforts undertaken by perverted-justice.org, Shannen Rossmiller, and the television program "To Catch a Predator."

A related approach is disclosed in U.S. Patent Application Publication No. 2007/0282623, entitled "Process for Protecting Children from Online Predators," that provides a user interface that a human nanny can use to monitor what children are typing online. This manual approach does not permit detection of delinquents based on their input messages, but rather requires human monitoring and interpretation.

U.S. Patent Application Publication No. 2008/0033941, entitled "Verified Network Identity with Authenticated Biographical Information," requires every user to send a biography. This biography is verified by running a background check that includes a criminal record analysis. The user can then connect to a limited number of OSNs. In addition to the disadvantages described above, a human has to be involved to check the biography, users will sacrifice privacy, and users are unable to access OSNs instantly, but rather have to wait months until background checking is conducted and incur significant cost.

Thus, there exists a need for a technique for detection of suspicious users of an online communication resource. There is a further need to provide systems and methods for detecting suspicious individuals on a friends list from OSN.

SUMMARY

Accordingly, an object of the present invention is to provide systems and methods for detecting suspicious individuals in a friend list.

Another object of the present invention is to provide systems and methods that compare friends on a friend's with a social graph or a generalized profile of OSN users by determining an interconnection of the social graph and with an interconnection of friends to see if they are appropriate.

A further object of the present invention is to provide systems and methods for detecting suspicious individuals in a friend list using heuristics.

These and other objects of the present invention are achieved in, a method for detecting friend or potential friend candidates as being suspicious in an OSN. A processor is used to obtain at least one candidate as being a suspicious friend in the OSN. One or more risk factors are used in the analysis. Heuristics are applied to the risk factors with the processor. In response, a determination is made as to whether the candidate is a suspicious individual. The processor can be software, hardware, or one or more individuals can use manual methods, to do the analysis and make the determination.

DESCRIPTION

Figure 1:
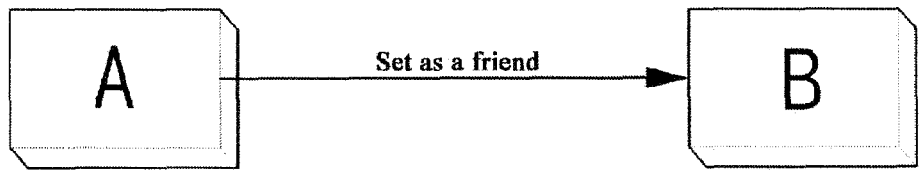
FIGS. 1 to 3 are views showing concepts of conventional online OSN methods.
Figure 2:
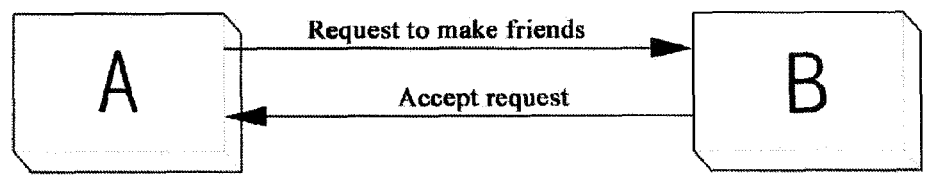
Figure 3:
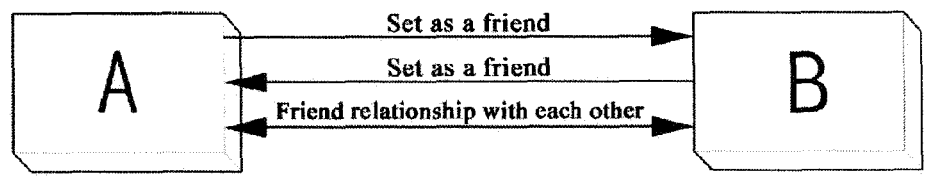

Although the present invention will be described herein primarily with regard to an exemplary embodiment directed determining to determining if a friend on a friend list from an OSN is a suspicious individual.

In one embodiment, the systems and methods of the present invention detect suspicious individuals in a friend list from websites which allow users to send messages to other users, allow individuals to create profiles and link with other profiles, creating a relationship sometimes referred to as friends, contacts, followers, e-mail contacts, asymmetric and symmetric contacts and the like (hereinafter referred to as "friends")

In one embodiment of the present invention, users connect to the Internet using a terminal, such as a personal computer (PC), a notebook computer, mobile device, or the like. Generally, communications among the users are accomplished through a website that provides services such as Internet communities, blogs, emails, status updates, posts, photos, and the like. In this case, the users have a status of a client, and the operator of the website becomes a server. Differently from such a server/client system, a network that horizontally connects terminals in a peer-to-peer method also exists. However, such a peer-to-peer system still needs a certain module in order to exchange information among peers and construct a community, and the module is generally provided by a server of a website that provides community services. Accordingly, users who participate in or desire to participate in an online-based human network join, as a member, a web tool provided for creating and maintaining the human network, i.e., join an Internet website that provide an OSN module.

Through community services provided by the Internet website, members take part in networking, and numerous communities are constructed. Each of the communities functions as an independent OSN. However, members belonging to a community do not belong to only one community, but can be duplicatively belonged to a plurality of communities, thereby having a very complex friend relationship. In the present invention, such a complex friend relationship is largely categorized into three logical groups, i.e., an application group, evaluation group, and determination group, from the viewpoint of creating the friend relationship. The application group is a group of members who request creation of the friend relationship. The determination group is a group of members who become counterparts of the application group, which determines whether to create the friend relationship. The evaluation group is a group that evaluates an applicant of the application group and generates evaluation information in response to a request from the determination group, which has a very important status in the present invention.

It will be appreciated that the present invention also provides that someone can follow someone else and their content without the other person needing to accept such a request.

In one embodiment of the present invention, systems and methods are used for detecting friend or potential friend candidates as being suspicious in an OSN. A processor is used to obtain at least one candidate as being a suspicious friend in the OSN. One or more risk factors are used in the analysis. Heuristics are applied to the risk factors with the processor. In response, a determination is made as to whether the candidate is a suspicious individual. The processor can be software, hardware, or one or more individuals can use manual methods, to do the analysis and make the determination.

More particularly, systems and methods are provided for analysis and detection of candidates as being suspicious individuals with friends or potential friends of a user in an OSN.

The present invention provides systems and methods for determining if a candidate is a suspicious individual. The systems and methods of the present invention apply risk factors in the analysis. The present invention is particularly useful for OSN activities and can be utilized with candidate individuals that are existing friends, new friends, individuals who are not yet friends, individuals who have not yet accepted friendship, and those where there is a friend request.

In one specific embodiment, the present invention obtains a list of friends of a user in the OSN. Friends on the list of friends are compared to at least one of a social graph or a generalized profile of OSN users by determining an Interconnection of the social graph and with an interconnection of friends to see if they are appropriate. This is defined as an analysis risk factor, but it is just one embodiment. The comparison being performed by the processor. In response, one or more of the friends are identified as a suspicious friend.

In one embodiment, statistical analysis is used to compare friends on the list of friends to the social graph or generalized profile of OSN users. If anomalies appear, the friend can be considered suspicious.

Candidates are analyzed using one or more of the following risk factors.

One risk factor is the number of friends in common that the candidate has with the user. The lower the number of mutual friends, the more likely they are suspicious. Candidates with zero friends with the user are particularly suspicious. There can be an absolute cut-off (like 0 or 1), a proportion of friends (example: less than 2%), or a statistical comparison (more than 2 standard deviations beyond the average number of mutual friends across the entire friend list).

Another risk factor is if the candidate is a member of a site with unusual or suspicious content. Each of these are risk factors and add to determining someone is suspicious. When any or more than one are found to be an issue, the suspiciousness is flagged.

Another risk factor is if the candidate has any evidence of questionable behaviors or activities including at least one of, violence, drugs, illegal activity, drinking, smoking, sex, cyber-bullying, depression, suicide, profanity, in person meetings, leaking of location including school, home, and the like. This activity can be found in posts, status, updates comments, tweets, or any other kind of OSN, activity. This can be achieved in a variety of methods including but not limited to, language, shorthand, or SMS/text abbreviation, and the like.

Another risk factor is if a candidate is labeled suspicious by a user of a monitoring system. The feedback could come from a $1^{st}$ party (within the system) or 3rd party monitoring system, individuals could be flagged by others as suspicious or deemed safe because they are trusted family or friends. The candidate may have been labeled as suspicious by a due to any number of risk factors. Once a candidate has been labeled suspicious by one user, he or she is more likely to be suspicious to another user Another risk factor is if candidate has been previously labeled as suspicious by a third party.

Another risk factor is if the candidate is listed in a criminal databases or sex offender database. Evaluation can be conducted using a variety of risk factors, including comparing at least one of name, email address, photo, zip code, city, state, or other information from the candidate's profile. Presence in one of these databases makes the candidate more suspicious. This can be achieved by comparing at least one of name, email address, photo, zip code, city, state, or other information from a friend's profile with a criminal or sex offender database. The database can be a local copy (either created internally or licensed from another party) or it can be accessed through APIs to different web services.

Another risk factor is the age difference between the candidate and the OCN user. The bigger the age difference, the more suspicious it is, especially for a child. Age can be determined by self-reported/published age or by heuristics (such as the kinds of accounts or interests they have) or even looking at a particular friend's friend list and calculating the average age or other statistical measure. If someone has friends that are mostly in their 40's, they are likely an adult.

Also, when considering children, it may be useful to flag any adult over 18.

Another risk factor is whether the candidate has one or more adult like accounts including but not limited to, dating websites, job websites, department store websites, websites requiring a credit card to register. It is highly unusual for a child to have such an account. Hence, if someone has one of these accounts, he or she is more suspicious, and likely an adult, than someone who does not have one of these accounts. It is even more suspicious if such a candidate represents themselves as a child.

Another risk factor is the geographic location difference between the user and the candidate Children's social graph of friends tend to be geographically near one another, which is less true for adults. If a significant distance exists between the user and the candidate, then the candidate is more suspicious and can be flagged and/or reported.

Another risk factor is if there is message communication between a user and the candidate that has not established a friend relationship with the user. If so, the individual would be considered more suspicious. For example, a stranger may contact a child without being the child's friend and the invention would consider this more suspicious. This could be a stranger reaching out to the user.

Another risk factor is if there is a lack of communication between the user and a candidate. A real friend tends to have back and forth communication, while others that may be lurking may never have back and forth communication. Another form of this is asymmetric communication, e.g., if the other person is always contacting the user but the user never responds. The lack of such communication across a longer timeline would be suspicious that they may not in fact be a typical friend. A candidate found to be suspicious from at least one of these risk factors can be highlighted or alerted to the user through the web, email, text/SMS, phone call, push notifications, or physical communication such as paper.

As shown in the embodiments of FIGS. 1-6, an evaluator, which is the software/processor that flags any of the risk factors or criteria described herein, identifies candidates as being suspicious individuals. An evaluator may be a user on the OSN, an automated computerized system, or a hybrid of the two. In the FIG. 5 embodiment, the evaluator is not a friend of A.

Evaluation information, such as that discussed above, is used to make the evaluation of an individual as a suspicious individual. In one embodiment, member $B_1$. generates evaluation information and provides the information to member B, and member B refers to the evaluation information and notifies whether to accept the request for making a friend relationship with member A. Member $B_1$ has an interest relation in making a friend relationship between member A and member B, since if member A makes friends with member B, member $B_1$ who already has a friend relationship with member B is involved in human networking with member A through member B. Accordingly, member B can obtain further objective evaluation information compared with the embodiment of FIG. 4, and it is advantageous in that opinions of members, who have been previously in a friend relationship with member B, on a new member who joins the networking can be understood. In this manner, member B can reasonably determine whether making a friend relationship with member A is beneficial. However, it is disadvantageous in that members belonging to the evaluation group are not quite acquainted with member A.

Figure 4:
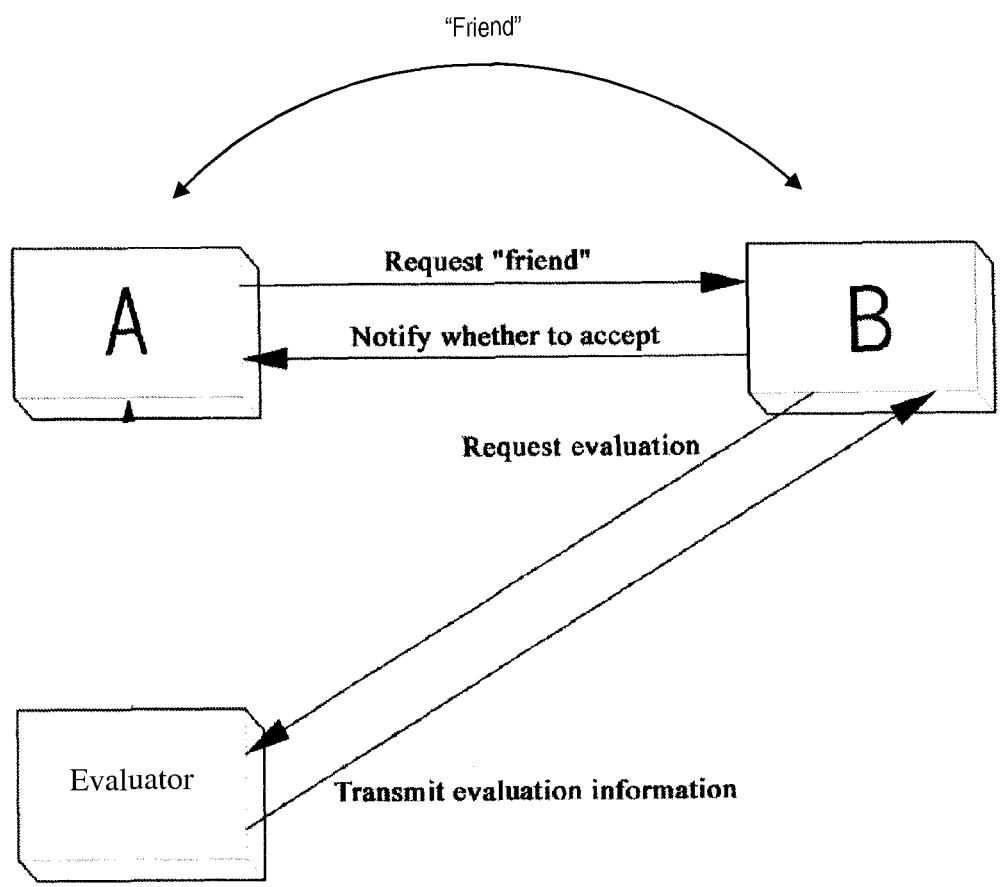
FIG. 4 is a view showing an evaluator being a friend of a member who requests registration of a friend relationship according to one aspect of the invention.
Figure 5:
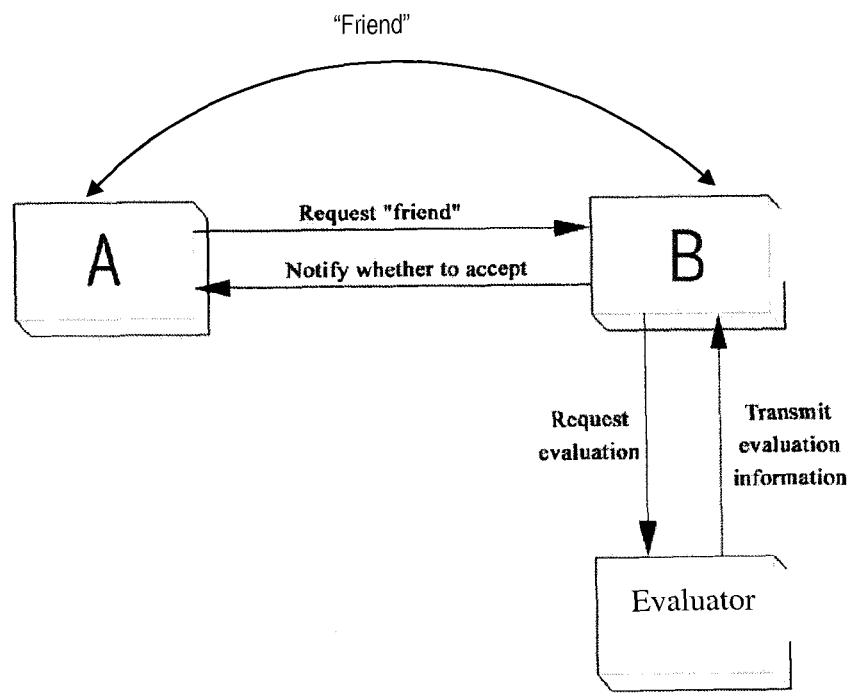
FIG. 5 is a view showing an evaluator being a friend of a member who has requested registration of a friend relationship according to another aspect of the invention.
Figure 6:
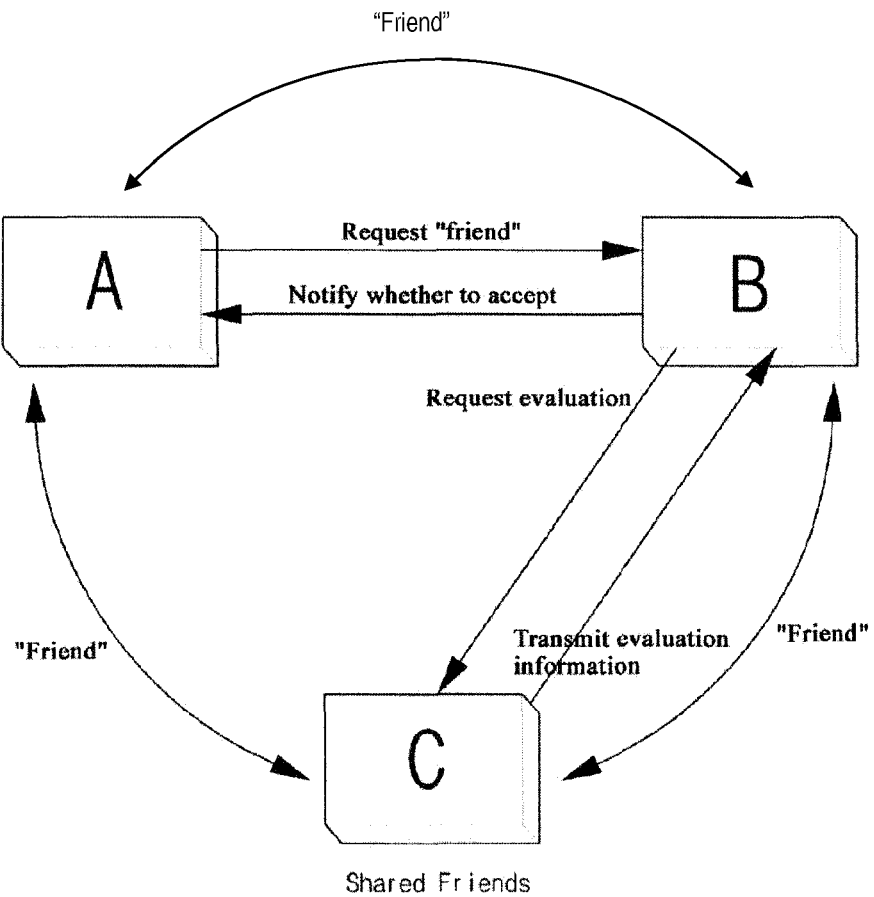
FIG. 6 is a view showing an evaluator being a shared friend of both a member who requests registration of a friend relationship and a member who has requested registration of the friend relationship according to still another aspect of the invention

FIG. 6 is a view showing an embodiment in which disadvantages of the embodiments of FIGS. 4 and 5 are complemented. Members belonging to the evaluation group are friends of members A and also have a friend relationship with member B. Accordingly, the advantages of the embodiments of FIGS. 4 and 5 can be expected.

FIGS. 7 to 11 are views constructed on the assumption that the embodiments of FIGS. 5 and 6 are combined among a variety of embodiments of the present invention. That is, third parties who perform evaluation are categorized into friends of member B and shared friends of member A and member B, or an automated computerized system. However, the present invention is not to be restricted by the embodiment depicted.

Referring to FIG. 6., a member A terminal requests a member B terminal to make a friend relationship. Member A and member B respectively have other members who have registered as having a friend relationship. For example, a friend list of member A shows "$A_1, A_2, A_3, \ldots,$ and $A_n$" (n is an integer not smaller than 1, which is the same hereinafter) and "$C_1, C_2, C_3, \ldots,$ and $C_n$". Members "$A_1, A_2, A_3, \ldots, A_n$" are not related to member B at all. However, members "$C_1, C_2, C_3, \ldots,$ and $C_n$" also have a friend relationship with member B. That is, members "$B_1, B_2, B_3, \ldots,$ and $B_n$" who are not related to member A are in a friend list of member B, together with members "$C_1, C_2, C_3, \ldots,$ and $C_n$" who are friends of member A. In the present invention, member B who is requested to make a friend relationship requests two groups, existing members who have a friend relationship with member B and members who have a friend relationship with both member A and member B, to generate evaluation information on member A.

Figure 7:
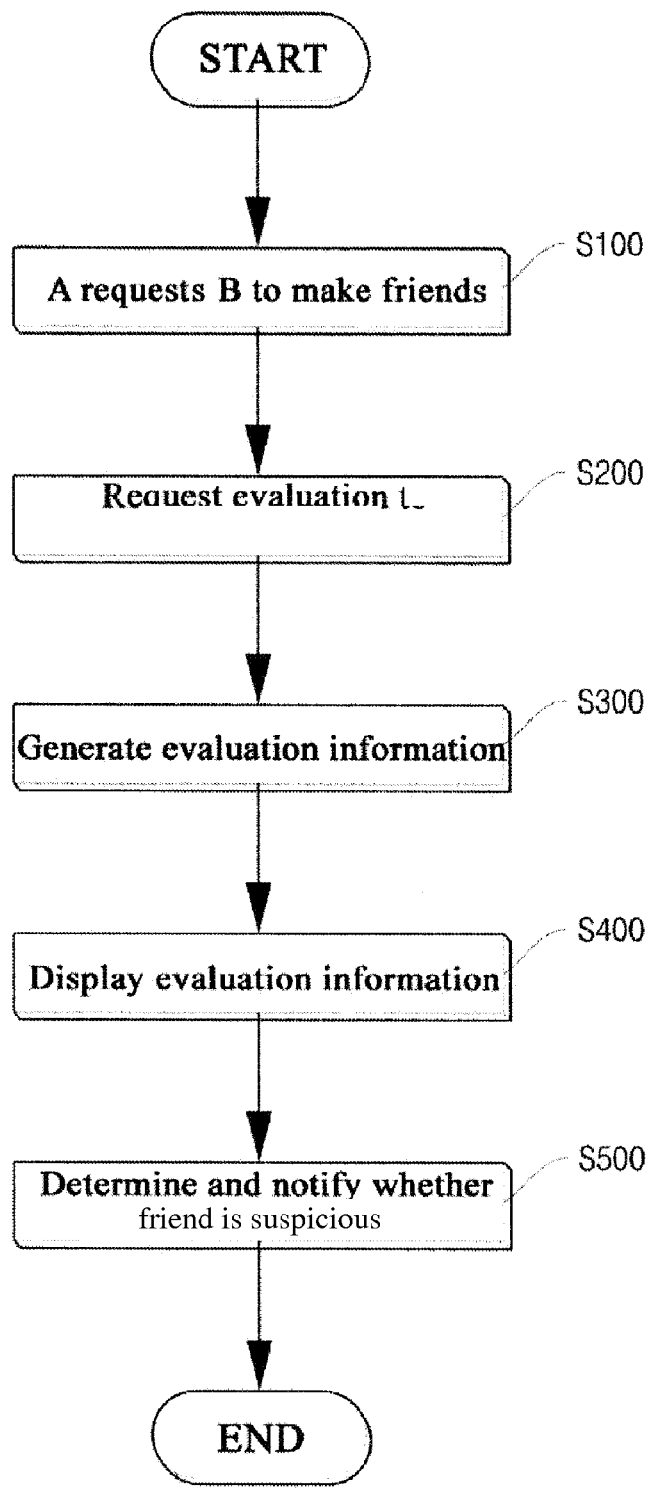
FIG. 7 is a flowchart illustrating one process used with the present invention.

FIG. 7 is a flowchart illustrating an example of an outline process method based on an evaluator's evaluation according to the present invention. A member A terminal desires to be a friend of another member B terminal. Accordingly, the member A terminal transmits a friend relationship registration request signal to the member B terminal S100. The member B terminal that receives the friend relationship registration request signal opens an evaluation request by executing the OSN module, selects one or more terminals among terminals belonging to an advisor group, and requests evaluation on member S200 is a request evaluation. A terminal of the advisor group that receives the evaluation request signal opens a webpage for evaluators by executing the OSN module and generates evaluation information on member A S300. The evaluation information issues an event, such as "Approval", "Disapproval", and "Indifference", and the like, and can include a text document for suggesting an opinion. It is important to note that this evaluation can apply to existing friends, new friends, or candidate friends. It may be performed as part of establishing the friendship to accept or reject a friend, or it may be performed after the friendship is already established.

As described above, the advisor group can be selected by appropriately combining one or more of {circle around (1)} a group of member A's friends, {circle around (2)} a group of member B's friends, {circle around (3)} a group of friends having a shared friend relationship with both member A and member B. In the preferred embodiment, the OSN module sets friends belonging to the friend group {circle around (2)} and {circle around (3)} as the advisor group. Accordingly, member B who receives the friend relationship registration request signal selects one or more members among the members belonging to the group {circle around (1)} and {circle around (2)}.

In one specific embodiment, member B terminal monitors a current evaluation state in real-time or at a later time, and transmits a response signal notifying whether to accept the friend relationship registration to the member A terminal referring to the evaluation information monitored. If the response signal is "Yes", the server registers the fact that member A is in a friend relationship with member B into a database, and accordingly, information on member A and member B is updated.

According to the present invention described above, third parties' opinions can be listened and integrated in building online human networking.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the risk factors (or operations) described therein without departing from the spirit of the invention. For instance, the risk factors may be performed in a differing order, or risk factors may be added, deleted or modified. All of these variations are considered a part of the claimed invention.

When a determination is made, authorities, parents, and others can be notified by one or more of, the web, email, text/SMS, phone call, push notifications and physical communication such as paper. These are items that have alerts in the web page, or an email summary is sent, or a text message is sent, or someone (or automated) makes a call, or even a physical message (letter or digest) is sent.

A computer program which has access to a user's friend list (either access on the local computer or access to a web service) and at least one risk factors can be used to determine suspiciousness. Additional risk factors may be executed and the presence of additional data from risk factors may increase suspiciousness, but not all the risk factors are required.

Each of the major elements may be conducted independently. If any of them are determined to be significant, than the user would be deemed suspicious. The presence of positive tests of multiple elements would make the user even more suspicious.

The individual elements are performed by a computer program, either one which is installed on the user's computer, or a website service. The computer program discovers a user's list of friends for a given service (such as email, OSNs, or similar web services). The computer program goes through this friend list and determines for each friend, whether the friend is viewed as suspicious by trying each of the mentioned risk factors. Each of these risk factors are accomplished by the computer program by accessing available data (public, private, or paid), website data from the service (example: through an available Application Programming Interface, API), or internal data to the computer program or service. If a friend is found to have met certain suspicious elements, the user or an evaluator associated with the user (e.g., a parent) is shown the suspicious friend. There may be text or an explanation as to why the friend is suspicious, but this is not required. This display may be done in several ways, but will make clear who is most suspicious based on these elements.

Figure 8:
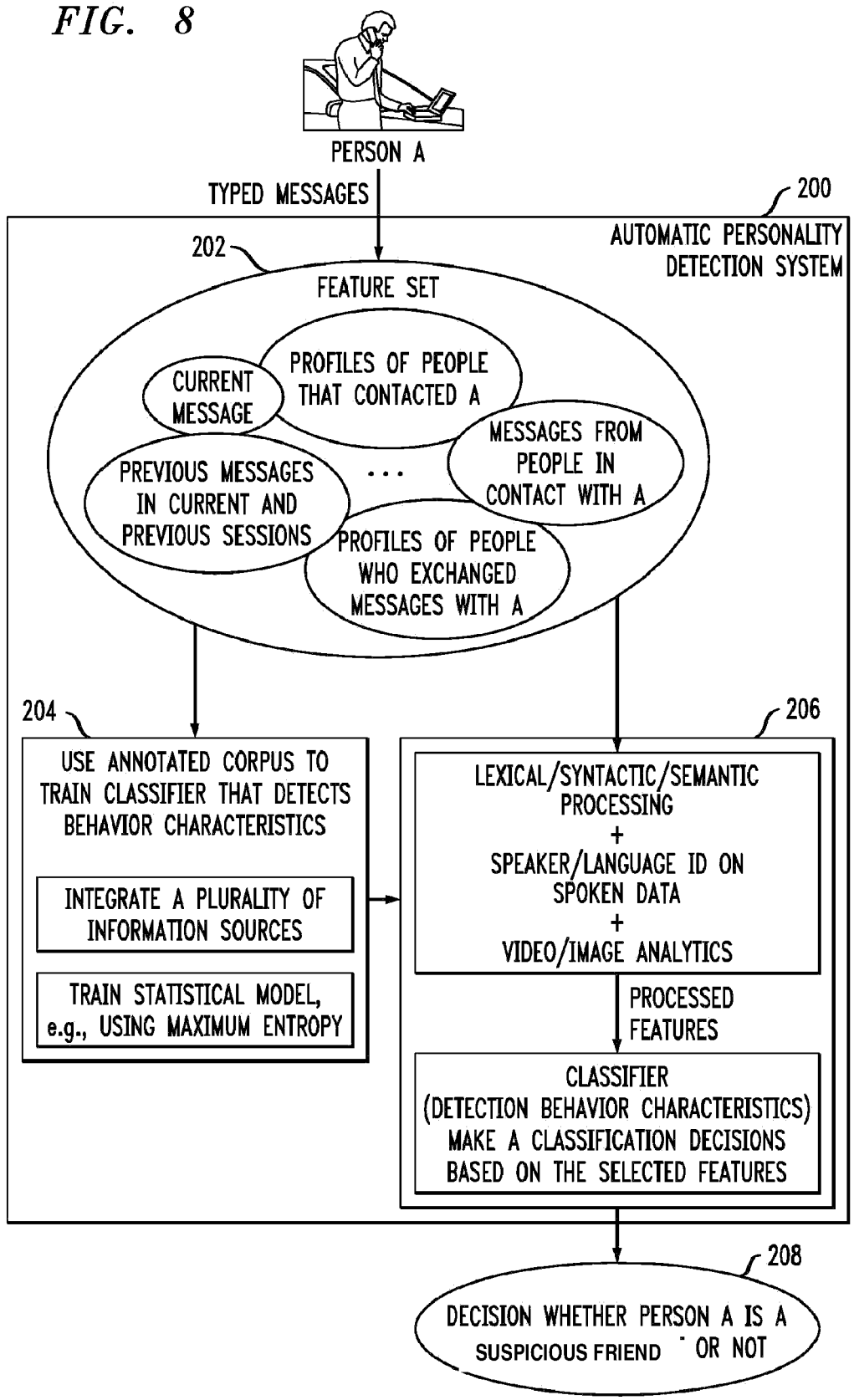
FIG. 8 is block diagram depicting an exemplary personality detection system according to an embodiment of the present invention.

FIG. 8 is block diagram depicting an exemplary personality detection system 200 according to an embodiment of the present invention, personality detection system 200 is preferably operative to receive typed messages from a user (Person A). System 200 relies on several potential features to detect whether a candidate person is suspicious individual. These features can be in a feature set 202 included in the personality detection system 200. As will be described in further detail herein below, detection system 200 can preferably employ a number of items to look for from the feature set 202 that detects behavior characteristics of the user, as depicted in functional block 204. During decoding 206, the personality detection system 200 can use various statistical models in conjunction with features extracted from the input message(s) from the user to determine (risk factor 208) whether a person is a suspicious individual or not.

In one embodiment, the feature set 202 includes friends with: (i) minimal friends in common or minimal overlap of their social graph, (ii) adult-like accounts on other online websites, (iii) suspicious accounts on other online websites, (iv) flags by other users of an evaluator, third party, monitoring system as suspicious, (v) other publicly available databases such as government criminal and sex offender databases, (vi) a significant difference in age with the user, (vii) significant physical location difference with the user, and the like. Additional triggers includes, (i) finding message communication or chat requests without having an established a friend relationship, (ii) limited or no contact with a user who has an established a friend relationship and the like The systems and methods of the present invention use triggers such as these to determine and highlight those people considered suspicious within a service. If multiple triggers are met, the friend can be considered even more suspicious.

Figure 9:
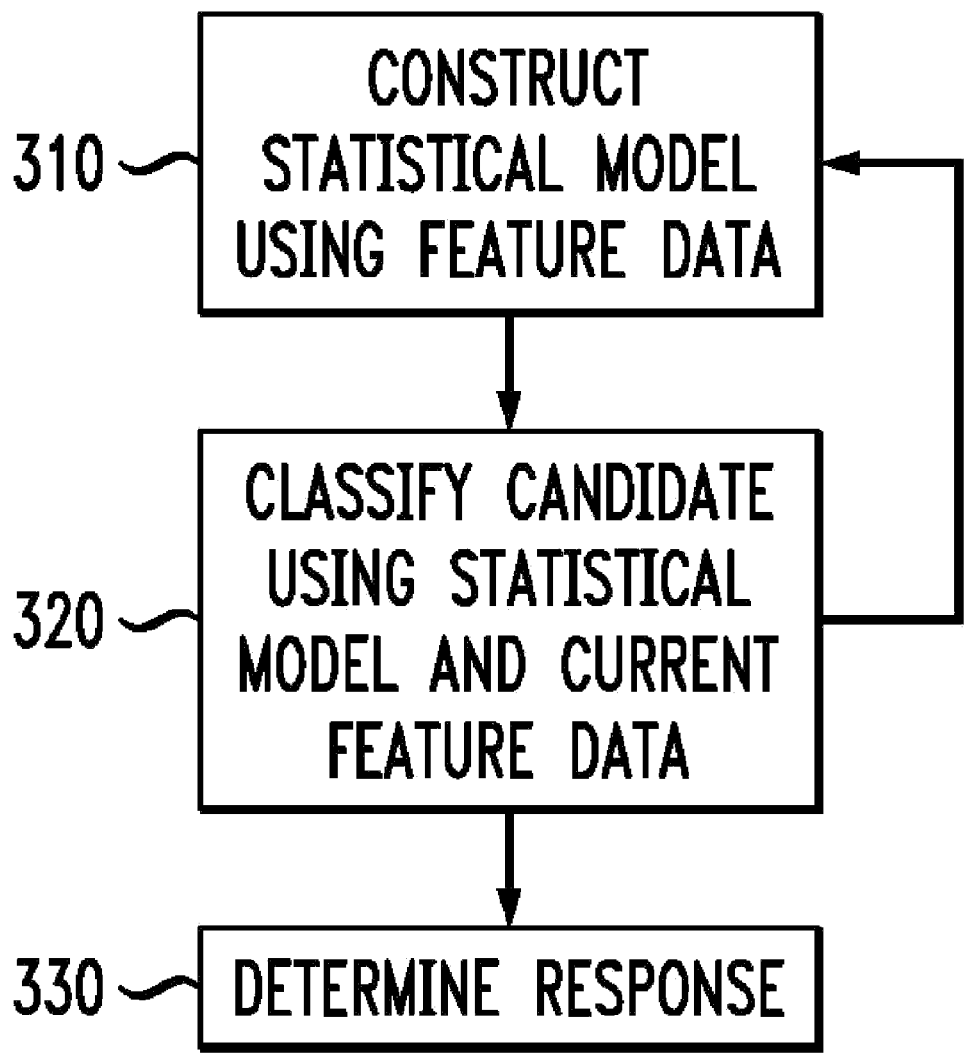
FIG. 9 is a flow diagram depicting an exemplary method for personality detection according to an embodiment of the present invention.

In another embodiment, FIG. 9 illustrates a method 300 for determining suspicious people. In risk factor 310, one or more statistical models are used with the features 202. In one embodiment, these features may be derived from sources including but not limited to, (i) the most recently inputted message by the user, (ii) the set of messages inputted by user in the current session; (iii) the set of messages inputted by user in one or more previous sessions, (iv) messages from other users that are in contact with the user, (v) the profile of the user if available, (vi) profiles of other users that are communicating with the user in current session, (vii) profiles of other users that have exchanged messages with the user in one or more previous sessions, and (viii) previous identifications of the user by the system.

Once a user logs in to an OSN and starts to input messages, the classifier immediately processes those messages and other available resources in the OSN database to extract features. Those features are then used to identify or classify the user's personality (e.g., detect if he/she is a potential suspicious individual or not). The input message can be in the form of text, speech, image and/or video. The classifier applies several natural language processing techniques on a feature set (source of information) to identify a suspicious individual. Examples of natural language processing techniques suitable for use with an illustrative embodiment of the present invention include: (1) Extraction of lexical features such as words, n-grams (previous/next words), morphological analysis of current input messages, etc.; 2) Extraction of syntactic analysis of the same messages such as the Part-Of-Speech, parse tree, and prop tree information; (3) Use of information which is the result of conducting semantic analysis on the input data to extract information such as date, time, location, organization, geopolitical entity, events, relations, co-reference between entities in the data, mentions, etc.; (4) If the input message comprises speech, use of techniques such as speaker identification, language identification, etc.; (5) If the input message comprises an image or a video, image and video analytics may be applied to extract relevant features (e.g., determining whether an image or video contains obscene images or pornography, etc.).

A binary classifier may be used if the goal is only to predict or classify whether a user is a suspicious individual or not. Alternatively or additionally, a multi-class classifier may be used to predict a category of suspicious individuals (e.g., suspicious individual, terrorist, killer, etc.). Moreover, in a preferred embodiment, the classifier can learn from previous decisions (e.g., by way of a feedback collection mechanism for modifying decisions or stored historical data) to adjust and re-adapt its results (as shown by the arrow leading from risk factor 320 to risk factor 310). Several unsupervised techniques in the machine learning field are available to achieve this, as will be understood by one having skill in the art.

In risk factor 330, an appropriate response may be generated responsive to the results of risk factor 320. For example, once a user is identified as a suspicious individual by the system, an instant message may be sent to notify a chat operator or law enforcement officer. Alternatively or additionally, a user may be ally removed or banned from the OSN responsive to a determination that the user is a suspicious individual or other undesirable user.

Figure 10:
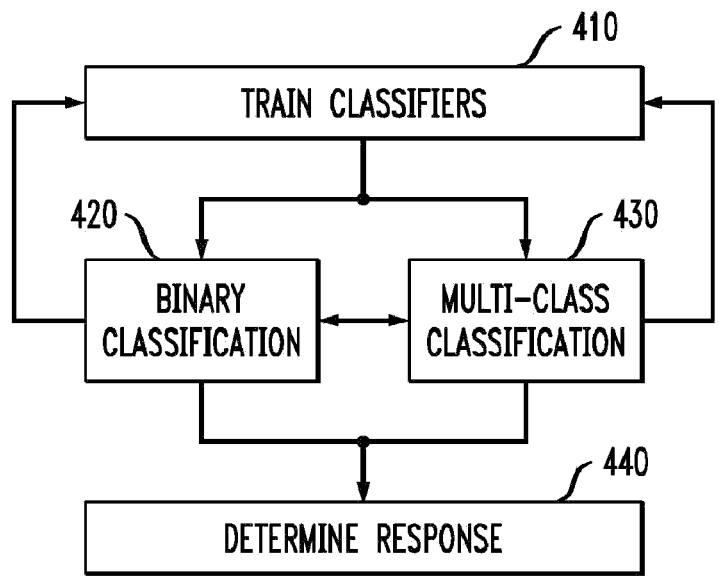
FIG. 10 is a flow diagram depicting another exemplary method for personality detection according to another embodiment of the present invention.

FIG. 10 illustrates another exemplary method 400 for personality detection, according to an illustrative embodiment of the present invention. Risk factor 410 is a training process similar to that described above with reference to risk factor 310 in FIG. 3. However, here, two classifiers are used: a binary classifier which will identify whether a user is a suspicious individual or not; and a multi-class classifier which can refine the result of the first classifier to detect what category of delinquency a user is.

In risk factor 420, the binary classifier is used to identify whether a user is a suspicious individual or not. In risk factor 430, responsive to a determination by the binary classifier that the user is a suspicious individual, a multi-class classifier determines what type of suspicious individual the user is. Again, one or more of the classifiers can learn from previous decisions to adjust and re-adapt its results (as shown by the arrows leading from risk factors 420 and 430 to risk factor 410). In risk factor 440, an appropriate response may be generated responsive to the results of risk factors 420 and/or 430. For example, once a user is identified as a suspicious individual by the system, an instant message may be sent to notify a chat operator or law enforcement officer. Alternatively or additionally, a user may be ally removed or banned from the OSN responsive to a determination that the user is a suspicious individual or other undesirable user. Different kinds of responses may be used for different types of suspicious individual s. For example, detection of a terrorist or a pedophile may result in notification of a law enforcement agency, whereas detection of a spammer or troll may not.

The methodologies of embodiments of the invention may be particularly well-suited for use in an electronic device or alternative system. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Computer program code for carrying out operations of the present invention may be written in any combination of one or more programming languages, including an object oriented programming language such as Java, Python, Ruby on Rails, C#, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be loaded onto a computer or other programmable data processing apparatus to cause a series of operational risk factors to be performed on the computer or other programmable apparatus to produce a computer implemented process such that the instructions, when executed on the computer or other programmable apparatus, provide processes for implementing the functions/acts specified in the flowchart and/or block diagram block or blocks.

Figure 11:
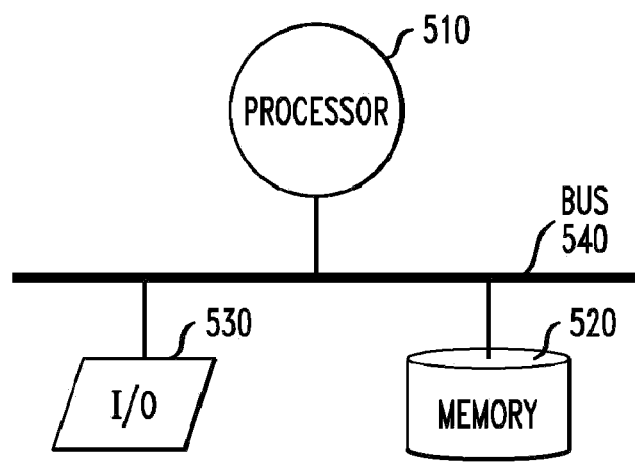
FIG. 11 is a block diagram depicting an exemplary processing system in which techniques of the present invention may be implemented.

For example, FIG. 11 is a block diagram depicting an exemplary processing system 500 formed in accordance with an aspect of the invention. System 500 may include a processor 510, memory 520 coupled to the processor (e.g., via a bus 540 or alternative connection means), as well as input/output (I/O) circuitry 530 operative to interface with the processor. The processor 510 may be configured to perform at least a portion of the methodologies of the present invention, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, touchscreen, etc.) for entering data to the processor, and/or one or more output devices (e.g., printer, monitor, display, etc.) for presenting the results associated with the processor.

Accordingly, an application program, or software components thereof, including instructions or code for performing the methodologies of the invention, as heretofore described, may be stored in one or more of the associated storage media (e.g., ROM, fixed or removable storage) and, when ready to be utilized, loaded in whole or in part (e.g., into RAM) and executed by the processor 510. In any case, it is to be appreciated that at least a portion of the components shown in the above figures may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

The flowchart and block diagrams in the figures illustrate the architecture, functionality, and operation of possible implementations of systems, methods and computer program products according to various embodiments of the present invention.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, risk factors, operations, elements, and/or components, but do not preclude the presence or addition of one or more other features, integers, risk factors, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In other embodiments, statistical analysis can also be utilized to determine the suspicious individuals.

In one embodiment, scores are combined that include the use of any number of machine learning approaches generally applicable to topic identification, including, for example:

Cosine similarity, as described in, for example, B. Bigi et al., "A Comparative Study of Topic Identification on Newspaper and E-mail," in String Processing and Information Retrieval-SPIRE, IEEE Computer Society, 2001;

2) Voted Perceptron, as described in, for example, Y. Freund & R. Shapire, "Large Margin Classification Using the Perceptron Algorithm," Machine Learning, Vol. 37, No. 3, pp. 277-296 (1999);

3) Support vector machines, as described in, for example, C. Saunders et al., Support Vector Machine Reference Manual, Department of Computer Science, Royal Holloway, University of London, 1998;

4) Conditional random fields, as described in, for example, J. Lafferty et al., "Conditional Random Fields: Probabilistic Models for Segmenting and Labeling Sequence Data," ICML, 2001;

5) Statistical decision trees;

(6) Term frequency-inverse document frequency (tf-idf), as described in, for example, C. J. Burges, "A Tutorial on Support Vector Machines for Pattern Recognition," in Data Mining and Knowledge Discovery, 1998, pp. 121-167;

(7) Bayesian classifiers, as described in, for example, P. Langley et al., "An Analysis of Bayesian Classifiers," In Proceedings of the Tenth National Conference on Artificial Intelligence, San Jose, Calif., 1992, pp. 399-406.

In one embodiment, a maximum entropy technique similar to that described in, for example, A. Berger et al., "A Maximum Entropy Approach to Natural Language Processing," Computational Linguistics, Vol. 22, No. 1, pp. 39-71 (1996), the disclosure of which is incorporated by reference herein, may be used. A major advantage of using maximum entropy is its ability to integrate diverse types of information (features) and make a classification decision by aggregating all information available for a given classification, as discussed in, for example, J. Goodman, "Exponential Priors for Maximum Entropy Models," HLT-NAACL 2004: Main Proceedings, pages 305-312, Boston, Mass., USA, May 2-May 7, 2004, Association for Computational Linguistics, the disclosure of which is incorporated by reference herein. Moreover, maximum entropy may be combined with other machine learning techniques, such as those enumerated above, as described in, for example, I. Zitouni et al., "Constrained Minimization Technique for Topic Identification using Discriminative Training and Support Vector Machines," in Proceeding of the International Conference on Speech and Language Processing, 2004.

Maximum entropy has many advantages over the rule-based methods of the prior art. For example, maximum entropy has the ability to integrate arbitrary types of information and make a classification decision by aggregating all information available for a given classification. Maximum entropy also permits the use of many information sources and provides flexibility and accuracy needed for changing dynamic language models. Maximum entropy modeling may be used to integrate a subset of one or more possible information sources, including those enumerated above. Information or features extracted from these sources may be used to train a maximum entropy model.

The maximum entropy method is a flexible statistical modeling framework that has been used widely in many areas of natural language processing. Maximum entropy modeling produces a probability model that is as uniform as possible while matching empirical feature expectations. This can be interpreted as making as few assumptions as possible in the model. Within the maximum entropy framework, any type of feature can be used, enabling the system designer to experiment with different feature types. Maximum entropy modeling permits combinations of multiple overlapping information sources. The information sources may be combined as follows:

$$P(o \mid h) = \frac{e^{\sum_i \lambda_i f_i(o,h)}}{\sum_{o'} e^{\sum_j \lambda_j f_j(o',h)}}$$

This equation describes the probability of a particular outcome (o) (e.g., one of the arguments) given an input message, feature set and the context. .lamda$_i$ is a weighting function or constant used to place a level of importance on the information being considered for the feature. Note that the denominator includes a sum over all possible outcomes (o'), which is essentially a normalization risk factor for probabilities to sum to 1. The indicator functions or features f$_i$ are activated when certain outcomes are generated for certain context:

$$f_i(o \mid h) = \begin{cases} 1, & \text{if } o = o_i \text{ and } q_i(h) - 1 \\ 0, & \text{otherwise,} \end{cases}$$

where o$_i$ is the outcome associated with feature f$_i$, and q$_i$ (h) is an indicator function for histories. The maximum entropy models may be trained using improved iterative scaling.

In risk factor 320, the classification model, statistical or rule-based, determined in risk factor 310 is applied to detect the personality of a user in an OSN (e.g., whether the user is a suspicious individual). During this detection or decoding risk factor, the system may use one or more models built during training as well as a set of features extracted from the input message(s) and other available resources to classify whether a person is suspicious individual or not. This set of features may be the same as the set of features used in the training phase to construct the model, it may be a subset thereof, or it may be a different set of features. A machine learning approach such as maximum entropy framework may be used to build the classification model based on these features. The classification model is then used to classify or identify the user and/or make a decision if the user is a suspicious individual or not.

A computer program which has access to a user's friend list (either access on the local computer or access to a web service) and at least one of the risk factors to determine suspiciousness. Additional risk factors may be executed and the presence of additional data from risk factors may increase suspiciousness, but not all the risk factors are required.

Each of the major elements may be conducted independently. If any of them are determined to be significant, than the user would be deemed suspicious. The presence of positive tests of multiple elements would make the user even more suspicious.

The individual elements are performed by a computer program, either one which is installed on the user's computer, or a website service. The computer program discovers a user's list of friends for a given service (such as email, social networks, or similar web services). The computer program goes through this friend list and determines for each friend, whether the friend is viewed as suspicious by trying each of the mentioned risk factors. Each of these risk factors are accomplished by the computer program by accessing available data (public, private, or paid), website data from the service (example: through an available Application Programming Interface, API), or internal data to the computer program or service. If a friend is found to have met certain suspicious elements, the user or a third party/evaluator associated with the user (e.g., a parent) is shown the suspicious friend. There may be text or an explanation as to why the friend is suspicious, but this is not required. This display may be done in several ways, but will make clear who is most suspicious based on these elements.

A person would use this invention by downloading software or signing up with a third party evaluator monitoring software site, providing the information on the user of a web or email service, and then taking risk factors necessary to have the computer program gain access to the friend list. The computer program would then check each friend against the elements described, determine the most suspicious friends, and let the user know.

Other embodiments of the invention will be apparent to those skilled in the art from consideration of the specification and practice of the invention disclosed herein. It is intended that the specification and examples be considered as exemplary only, with a true scope and spirit of the invention being indicated by the appended claims.

What is claimed is:

1. A method of detecting a candidate as being suspicious in an on-line social network (OSN), comprising:
   using a processor to obtain at least one candidate seeking to make a friendship with a user as being a suspicious friend in the OSN, the user having a set of friends that includes an determination group of one or more friends and an evaluation group of one or more friends;
   using one or more risk factors about the candidate applying heuristics to the risk factors with the processor, at least one of the risk factors being obtained from information relating to the candidate received from the evaluation group of friends, the information including on-line opinion information about the candidate obtained from the evaluation group of friends, the opinion information selected from at least one of an approval, a disapproval and an indifference; and
   in response, identifying a candidate as being a suspicious individual.

2. The method of claim 1, wherein application of the heuristics includes analysis of a social graph.

3. The method of claim 1, wherein at least one of the risk factors is, a number of friends in common that the candidate has with the user.

4. The method of claim 3, wherein the fewer number of mutual friends, the more likely that the candidate is a suspicious friend.

5. The method of claim 3, wherein a candidate with zero friends with the user is particularly suspicious.

6. The method of claim 3, wherein there is at least one of, an absolute upper cut-off, a proportion of friends cut-off, and a comparison to a statistical measure of mutual friends between the candidate and the various users to determine if the candidate is suspicious.

7. The method of claim 6, wherein the statistical measure is at least one of an average, a median, and standard deviation.

8. The method of claim 1, wherein at least one of the risk factors is, if the candidate is a member of a site with unusual or suspicious content.

9. The method of claim 1, wherein at least one of the risk factors is, if the candidate has any evidence of questionable behaviors or activities.

10. The method of claim 9, wherein the behaviors or activities are selected from at least one of, violence, drugs, illegal activity, drinking, smoking, sex, cyber-bullying, depression, suicide, profanity, in person meetings, leaking of location including school and home.

11. The method of claim 1, wherein at least one of the risk factors is, if a candidate is labeled suspicious by a user of a monitoring system.

12. The method of claim 10, wherein feedback as being labeled suspicious is from at least one of, a 1.sup.st party within the system and a 3rd party monitoring system.

13. The method of claim 10, wherein the candidate is labeled suspicious by others.

14. The method of claim 10, wherein the candidate is deemed safe because they are trusted family or friends.

15. The method of claim 1, wherein at least one of the risk factors is, if candidate has been previously labeled as suspicious by a third party.

16. The method of claim 1, wherein at least one of the risk factors is, if the candidate is listed in at least one of, a criminal databases and a sex offender database.

17. The method of claim 1, wherein at least one of the risk factors is, an age difference between the candidate and the user.

18. The method of claim 15, wherein the larger the age difference, the more suspicious the candidate is.

19. The method of claim 16, wherein age is determined by at least one of, self-reported/published age, heuristics, kinds of accounts, and interests, and a review of a particular friend's friend list and calculating a statistical measure to approximate age based on friend's ages, including average or median age or other statistical measure.

20. The method of claim 1, wherein at least one of the risk factors is, whether the candidate has one or more adult like accounts.

21. The method of claim 18, wherein the adult like accounts include at least one of, dating websites, job websites, department store websites and websites requiring a credit card to register.

22. The method of claim 1, wherein at least one of the risk factors is, a geographic location difference between the user and the candidate.

23. The method of claim 20, wherein the candidate is suspicious when a significant distance exists between the user and the candidate.

24. The method of claim 1, wherein at least one of the risk factors is, if there is message communication between a user and the candidate that has not established a friend relationship with the user.

25. The method of claim 1, further comprising: providing notification of a suspicious friend from at least one of, highlighted or alerted to the user through the web, email, text/SMS, phone call, push notifications and physical communication.

26. The method of claim 1, wherein each of a risk factor used is combined to create a score for a level of suspiciousness.

27. The method of claim 1, wherein application of the risk factors is a self learning process and provides feedback to the scoring.

* * * * *